United States Patent [19]
Helgesson

[11] 4,022,101
[45] May 10, 1977

[54] SCREW-SOCKET FIXTURE

[75] Inventor: Claes Ivar Helgesson, Akersberga, Sweden

[73] Assignee: Arbman Development AB, Stockholm, Sweden

[22] Filed: Feb. 9, 1976

[21] Appl. No.: 656,465

Related U.S. Application Data

[63] Continuation of Ser. No. 519,711, Oct. 31, 1974, abandoned.

[52] U.S. Cl. .................................................. 85/85
[51] Int. Cl.[2] ........................................ F16B 13/06
[58] Field of Search ............. 85/82, 84, 85, 63, 83, 85/14, 8.3; 151/14.5

[56] References Cited
UNITED STATES PATENTS

| 2,709,389 | 5/1955 | van der Kleij | 85/85 |
| 3,477,337 | 11/1969 | Racki | 85/82 X |
| 3,854,373 | 12/1974 | Romey | 85/82 |

FOREIGN PATENTS OR APPLICATIONS

| 134,763 | 10/1949 | Australia | 151/14.5 |
| 655,797 | 12/1928 | France | 85/82 |
| 1,525,224 | 4/1968 | France | 85/85 |
| 474,685 | 8/1969 | Switzerland | 85/82 |
| 306,925 | 5/1929 | United Kingdom | 85/82 |
| 670,870 | 4/1952 | United Kingdom | 85/85 |

*Primary Examiner*—Ramon S. Britts
*Attorney, Agent, or Firm*—Sughrue, Rothwell, Mion, Zinn & Macpeak

[57] ABSTRACT

A fixture for anchoring a machine screw in a hole in brickwork, concrete or stone comprises a socket which can be inserted into the hole, the diameter of which is not more than 1.1 times larger than the diameter of the screw. The thickness of the socket is between 3 and 7 % of the diameter of the screw and the material of the socket is selected from those being highly ductile when stressed beyond its yield point. The material of the socket will then after undergoing plastic deformation when the screw is tightened, fill at least one-half of the volume between the screw thread and the walls of the hole. The material of the sockets may consist of a metal or plastic material of deepdrawing quality, such as steel, brass, a tombac alloy or Delrin (polyoxymethylene).

2 Claims, 2 Drawing Figures

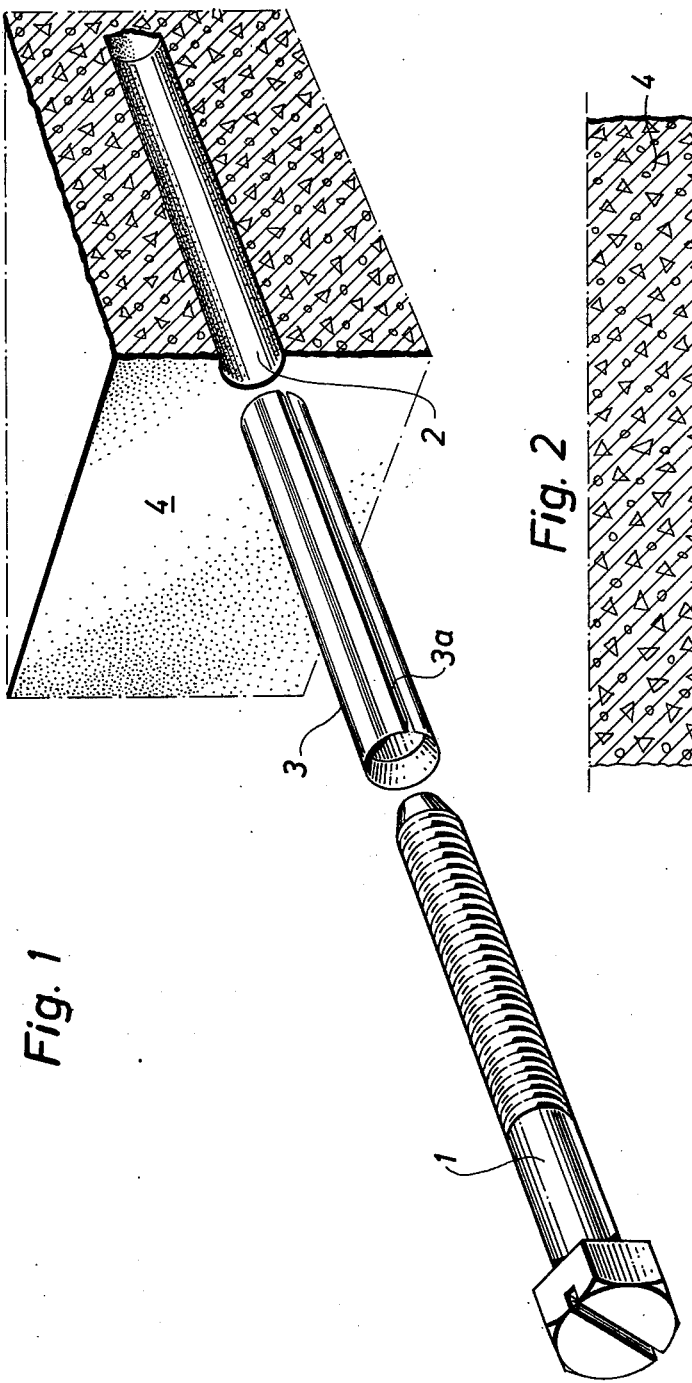
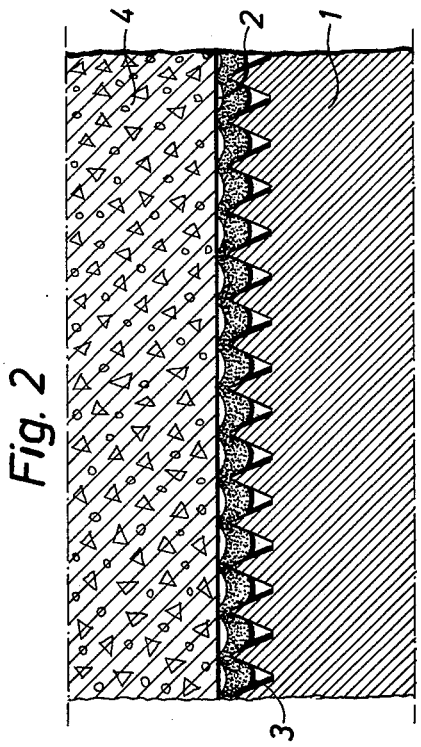

SCREW-SOCKET FIXTURE

This is a continuation of application Ser. No. 519,711, filed Oct. 31, 1974, now abandoned.

The present invention concerns a fixture for anchoring a screw in a hole in brickwork, concrete or stone, comprising a socket which can be inserted into the hole, and a machine screw.

The invention is based upon the fact that with a type of socket that is simpler and requires less material than hitherto it is possible to obtain a fixture of the above type which requires a much stronger force to extract than the force previously achievable, and that in various practical cases the desired extraction force can be achieved by optimizing certain characteristics of components in the fixture.

A fixture according to the present invention is characterized essentially in that the diameter of the hole is not more than 1.1 times larger than the diameter of the screw, the thickness of the socket is between 3 and 7% — preferably about 5% — of the diameter of the screw and the material of the socket is highly ductile when stressed beyond its yield point. After undergoing plastic deformation when the screw is tightened, the material of the socket fills at least one-half of the volume between the screw thread and the walls of the hole.

Since the material of the socket undergoes plastic deformation when the screw is being screwed in and is compressed to its yield point after the screw is tightened, the extraction force depends upon the frictional force between the socket and the hole along the entire inside surface of the hole, the friction of which in theory equals the coefficient of friction $x$ the yield stress of the socket $x$ the wall-area of the hole. Owing to the plastic deformation of the material of the socket, the space between the thread and the wall of the hole is well filled to the above-mentioned extent and this in turn is a required condition for the high extraction force desired.

It is preferable that the material of the socket and diameter of the screw are chosen so that the desired extraction force obtained lies within the limits of torque achievable in practice for tightening the screw.

This tightening torque is determined, among other factors, by the yield point of the material, the depth of the screw thread and thread angle, and also to some extent by the friction between the screw and the socket.

In practice it is preferable that the material of the socket should consist of a metal or plastic material of deep-drawing quality, such as steel, brass, a tombac alloy or Delrin (polyoxymethylene). A lower tightening torque for the screw in relation to the extraction force can then be obtained by using a comparatively hard material for the socket with a small diameter in preference to a soft material with a large diameter.

If a metallic material without excessive strain hardening is used for the socket — such as pure aluminium, deep-drawing steel or a plastic material such as Delrin — high extraction forces can be obtained even with very moderate tightening torque.

In practice, the socket should be designed so that it can easily be inserted in the hole, i.e. by reducing the outside diameter during insertion, followed by elastic spring-back, and also so that the screw thread grips relatively soon after insertion of the screw, without the socket rotating in the hole. For the simplest version, the socket can therefore consist of a cylinder with an oblique slot. On insertion, the socket is compressed to some extent, and owing to the oblique slot the socket is deformed asymmetrically. After insertion into the hole, the shape of the socket should be that of a substantially true geometrical cylinder — and should preferably also have some residual elasticity so that it exerts some pressure against the walls of the hole. At one end, the cylinder should be tapered to some extent on the inside, enabling the screw thread to grip fairly easily.

One embodiment of the invention is shown in the accompanying drawing.

FIG. 1 is a perspective exploded view showing the fixture components.

FIG. 2 is a cross-section showing part of the fixture in the screw-tightened position.

The screw 1 shown in FIG. 1 may consist of, for example, a machine-threaded screw with the ISO type designation M6. A hole 2 with a diameter of 6.1 mm — which in practice can be obtained with a 6 mm-drill — is drilled in the wall 4. The socket 3 for the fixture may consist of, for example, brass and has a wall thickness of 0.3 mm. When the screw is tightened (FIG. 2), the socket fills approximately 70–80% of the space between the screw thread and the wall of the hole.

Examples are given in the tables below of the relative extraction force that can be achieved with different fixtures designed in accordance with the present invention, for varying screw diameters and socket-material characteristics. The numeral 1 in the respective tables indicates the relative extraction force, which thus constitutes a reference value and which in a test carried out with a ¼ inch-screw and a socket material with a $\sigma$-value of 25 kgf/mm$^2$ (carbon steel for deep drawing) was found to be approx. 1250 kgf.

It will be seen from Table 1 that the extraction force decreases with increasing softness of the material of the socket used for the fixture.

Table 1.

| | Extraction force; relative values for different socket materials and screw sizes | | | |
|---|---|---|---|---|
| Screw | Material 1 = 25kgf/ mm$^2$ | Material 2 = 15kgf/ mm$^2$ | Material 3 = 10kgf/ mm$^2$ | Material 4 = 7kgf/ mm$^2$ |
| ¼" | 1 | 0.6 | 0.4 | 0.3 |
| M10 | 2.5 | 1.5 | 1 | 0.7 |
| M12 | 3.5 | 2 | 1.5 | 1 |
| M16 | 6 | 3.5 | 2.5 | 1.7 |
| M20 | 10 | 6 | 4 | 2.9 |

Table 2.

| | Tightening torque; relative values for different socket materials and screw sizes | | | | |
|---|---|---|---|---|---|
| Screw | Material 1 =25kgf/ mm$^2$ | Material 2 =15kgf/ mm$^2$ | Material 3 =10kgf/ mm$^2$ | Material 4 =7kgf/ mm$^2$ | |
| ¼" | 1 | 0.6 | 0.4 | 0.3 | ref. value: ¼", material 1: Torque (lubricated screw 0.75 kgf-m) |
| M10 | 4 | 2.4 | 1.6 | 1.1 | |
| M12 | 7 | 4.2 | 2.8 | 2 | |
| M16 | 17 | 10 | 7 | 4.7 | |
| M20 | 33 | 20 | 13 | 9 | |

Examples of materials (see Tables 1 and 2):
Material 1, carbon steel for deep drawing, $\sigma = 25$ kgf/mm$^2$ Material 3, deep-drawing brass (70–72% Cu, $\sigma = 10$ kgf/mm$^2$ Material 4, pure aluminium, $\sigma = 7$ kgf/mm$^2$ The above Table 2 shows the tightening torques. The reference value obtained with a ¼ inch screw and material 1 with a $\sigma$-value of 25 kgf/mm$^2$ is 1.5 kgf-m. If the screw is lubricated, the reference value is 0.75 kgf-m.

The tables reveal a clear correlation between the socket material characteristics and the extraction force or tightening torque for screws of different sizes. Numerical values calculated theoretically were found to agree very closely with values obtained in practice.

When the screw is screwed in, the socket is compressed with such force that the stress produced exceeds the yield point of the material of the socket, causing plastic deformation. Most of the space between the screw thread and the wall of the hole is filled with socket material when the screw is right home. The extraction force then depends upon the residual elastic stress in the socket — i.e. the yield point of the material of the socket — and the coefficient of friction between the socket and the walls of the hole. The tightening torque is determined in the same way — i.e. by the surface area of the screw thread, the coefficient of friction between the socket and the screw, the socket material yield point and the mean screw radius. The above tables show that high extraction forces can be achieved by optimizing these material characteristics, without excessive tightening torque.

It is preferable to use a socket material which exhibits purely elastic behaviour when stressed up to a specific yield stress beyond which plastic deformation occurs — e.g. a metal such as brass, or a tombac alloy. Not quite so suitable are materials which show visco-elastic behaviour — plastics, for example — because the state of elasticity produced by tightening the screw decreases fairly rapidly with time, with the result that the contact with the walls of the hole is greatly reduced, and hence the extraction force as well. Such materials also undergo creep during long-time application of stress with a load considerably lower than the maximum extraction force recorded with short-time loading. For visco-elastic materials (plastics) both of these phenomena — relaxation and creep — are highly temperature-dependent, and with temperature increases even up to, e.g., 50° C, these processes take place at a rate more than twice that at room temperature. Because of the behaviour of visco-elastic materials, large safety margins must be applied here — which is not the case for sockets of materials with a well-defined yield point, such as metals. However, good results have been obtained with a socket of Delrin (polyoxymethylene).

What is claimed is:

1. An anchoring assembly for anchoring a machine screw in brickwork, concrete or stone, said anchoring assembly comprising in combination a machine screw having an enlarged head and a threaded shank of predetermined crest diameter, a workpiece of brickwork, concrete or stone having a smooth wall hole therein, and a generally cylindrical socket within said hole, said screw threadably carried within said cylindrical socket, said hole diameter being larger than the crest diameter of the screw but no larger than 1.1 times that crest diameter, said cylindrical socket having an initially smooth interior and exterior walls, said socket being formed of a material capable of plastic deformation beyond its yield point upon screw insertion, said socket having a wall thickness between 3% and 7% of the crest diameter of the screw, and having an initially outer diameter in a relaxed state in excess of the diameter of said hole and said socket further having means to allow by elastic radial compression the reduction of its outer diameter to that of said hole facilitating insertion of said socket into said hole, the exterior wall of said socket frictionally gripping the smooth wall of said hole, and said socket further having an inner diameter as insertably carried by said hole which is smaller than the crest diameter of said screw, the entire wall of said socket being plastically deformed beyond its yield point as a result of said screw being threaded thereinto and filling at least one half the volume between the screw threads and the wall of the hole so as to provide a high retention force acting on the screw and therebetween the smooth wall socket and the smooth wall hole.

2. A device according to claim 1 wherein the socket is made from a metal selected from the group consisting of steel, brass, or tombac alloy.

* * * * *